(12) United States Patent
Tavli et al.

(10) Patent No.: US 7,411,919 B2
(45) Date of Patent: Aug. 12, 2008

(54) MULTI-HOP TIME RESERVATION USING ADAPTIVE CONTROL FOR ENERGY EFFICIENCY

(75) Inventors: Bulent Tavli, Rochester, NY (US); Wendi Heinzelman, Pittsford, NY (US)

(73) Assignee: University of Rochester, Rochester, NY (US)

( * ) Notice: Subject to any disclaimer, the term of this patent is extended or adjusted under 35 U.S.C. 154(b) by 1090 days.

(21) Appl. No.: 10/388,762

(22) Filed: Mar. 17, 2003

(65) Prior Publication Data

US 2004/0184473 A1 Sep. 23, 2004

(51) Int. Cl.
*H04B 7/14* (2006.01)
*H04J 1/10* (2006.01)
*H04J 3/08* (2006.01)
*H04J 3/16* (2006.01)
*H04J 3/22* (2006.01)
*H04L 12/43* (2006.01)

(52) U.S. Cl. .................. 370/315; 370/461; 370/468

(58) Field of Classification Search .................. None
See application file for complete search history.

(56) References Cited

U.S. PATENT DOCUMENTS

| | | | |
|---|---|---|---|
| 4,593,282 A | | 6/1986 | Acampora et al. |
| 5,384,777 A | * | 1/1995 | Ahmadi et al. .............. 370/337 |
| 5,497,504 A | * | 3/1996 | Acampora et al. .......... 455/436 |
| 5,613,198 A | * | 3/1997 | Ahmadi et al. .............. 370/337 |
| 5,761,430 A | | 6/1998 | Gross et al. |
| 5,850,592 A | * | 12/1998 | Ramanathan .................. 455/7 |
| 5,974,236 A | | 10/1999 | Sherman |
| 6,031,827 A | | 2/2000 | Rikkinen et al. |
| 6,192,230 B1 | * | 2/2001 | van Bokhorst et al. ... 455/343.3 |
| 6,438,136 B1 | | 8/2002 | Bahl |
| 6,493,334 B1 | | 12/2002 | Krzymien et al. |
| 6,498,785 B1 | | 12/2002 | Derryberry et al. |
| 6,788,937 B1 | | 9/2004 | Willenegger et al. |
| 2002/0018448 A1 | | 2/2002 | Amis et al. |
| 2002/0169846 A1 | | 11/2002 | Chen et al. |

FOREIGN PATENT DOCUMENTS

WO WO 01/45437 A1 6/2001

OTHER PUBLICATIONS

Qiu, et al., Dynamic Reservation Multiple Access (DRMA): A new multiple access scheme for Personal Communication System (PCS), 1996, Communication Sciences Institute, Dept. of Electrical Engineering, University of Southern California, pp. 117-128.

Hanzo, et al., A Packet Reservation Multiple Access Assisted Cordless Telecommunication Scheme, 1994, IEEE Transactions Onvehiclur Technology, vol. 432, No. 2, pp. 234-244.

* cited by examiner

*Primary Examiner*—Daniel J Ryman
(74) *Attorney, Agent, or Firm*—Blank Rome LLP

(57) ABSTRACT

The present invention extends the TRACE (Time Reservation Using Adaptive Control for Energy Efficiency) protocol to allow multi-hop communication in dispersed radio networks. The nodes in the network are dynamically clustered based on proximity and interference level. Time is divided into superframes, each cluster choosing a frame within the superframe for data transmission to reduce the likelihood of interference.

5 Claims, 6 Drawing Sheets

MULTI-HOP TIME RESERVATION USING ADAPTIVE CONTROL FOR ENERGY EFFICIENCY

SUMMARY OF THE INVENTION

The present invention is directed to technique for cluster formation and time reservation in networks such as radio networks and more specifically to a technique for use in multi-hop communication.

DESCRIPTION OF RELATED ART

In a wireless radio network, the transmission medium is common to all radios, and the MAC protocol controls access to this shared medium. The objective of controlled access is to avoid simultaneous transmission attempts (that will result in collisions) while maintaining the maximal throughput, minimal energy, and bounded packet delay of the whole network.

MAC protocols can be classified into two main categories: centralized and distributed. In a distributed MAC protocol, radios communicate without a central controller or base station. In other words, every radio should create its own access to the medium through a predetermined set of rules (e.g., IEEE 802.11). A centralized MAC protocol, on the other hand, has a controller node or a base station that is the maestro of the network (e.g., Bluetooth). All the nodes in the network access the medium through some kind of schedule determined by the controller.

Although distributed MAC protocols are deemed as the best existing solutions for multi-hop networks, they are not favorable in single-hop networks because they do not perform as well as centralized MAC protocols in single hop networks. In addition, centralized MAC protocols are generally more deterministic than distributed MAC protocols, which is a desirable feature for real-time traffic with delay constraints. As a result, it is advantageous to use a centralized MAC protocol in a single hop network that supports real-time traffic delivery. For example, in an IEEE 802.11 network, all nodes should be active all the time, because they do not know when the next transmission is going to take place. However, in a Bluetooth network, nodes can enter sleep mode frequently due to the explicit polling of the slave nodes by the master node, which is an effective method to save power. Moreover, the IEEE 802.11 protocol cannot guarantee bandwidth or delay constraints or fair medium access. In fact, all of these parameters are functions of the data traffic, and they become unpredictable and often unacceptable at high data rates. However, some centralized algorithms can guarantee some of the above requirements within certain ranges by making use of coordination via scheduling.

A centralized MAC protocol can work with TDMA, FDMA, CDMA or hybrid physical layers. Among them, TDMA is the most appropriate choice for power savings because radios can go to sleep mode whenever they are not involved with data transmission/reception. In a centralized TDMA type MAC protocol, the two most important issues are the controller assignment and the data transmission schedule, which correspond to the coordinator and the coordination, respectively. The coordinator could be a fixed predetermined radio, which is the sole controller for the entire network lifetime. The main drawback of this approach is that whenever the controller dies, the whole network also dies. The controller dissipates more energy than other nodes because of its additional processes and transmissions/receptions. Because of this higher energy dissipation, most possibly the controller will run out of energy before all the other nodes, leaving the entire network inoperable for the rest of the network lifetime, even though many other remaining nodes have enough energy to carry on transmissions/receptions. The data transmission schedule could also be fixed, but this does not allow the system to adapt to dynamic environments such as nodes entering the network. The alternative approach to a fixed controller and schedule is dynamic coordinator switching and schedule updating, which is a remedy for the problems described above. However, this approach comes with its own problems: overhead in controller handover and increased overhead in the schedule updates.

The information content in a broadcast medium may be higher than the usable range of a single node, in which case the nodes should select to receive only certain data packets. The straightforward approach, which is listening to all data transmissions, keeping the ones desired, and discarding the others, is a highly inefficient way of discriminating data. An energy efficient method is information summarization before data transmission.

The inventors have previously developed a MAC protocol called TRACE (Time Reservation using Adaptive Control for Energy Efficiency). TRACE is described in B. Tavli and W. B. Heinzelman, "TRACE: Time Reservation Using Adaptive Control for Energy Efficiency," to appear in *IEEE J. Select. Areas Comm.*, 2002, whose disclosure is hereby incorporated by reference in its entirety into the present disclosure. TRACE uses dynamic coordinator switching and schedule updating to adapt to a changing environment and reduce energy dissipation in the nodes. Other features of TRACE, such as information summarization, data stream continuation monitoring, multi-level coordinator backup, priority based channel access, and contention for channel access reinforce the energy-efficiency, reliability, bounded delay, and maximized throughput of the network.

TRACE is an energy-efficient dynamic TDMA protocol designed for real-time data broadcasting. In TRACE, data transmission takes place according to a dynamically updated transmission schedule. Initial access to data slots is through contention, but once a node reserves a data slot, its reservation for a data slot in the subsequent frames continues automatically as long as the node continues to broadcast a packet in each frame. Thus, nodes only need to contend for data slots at the beginning of data bursts.

A controller in the network is responsible for creating the TDMA schedule based on which nodes have continued reservations from previous frames and which have successfully contended for data slots in the current frame. The controller transmits this schedule to the rest of the nodes in the network at the beginning of the data sub-frame. Whenever the energy of the controller drops below the energy level of the other nodes in the network by more than a set amount, it assigns another radio with higher energy than itself as the next controller. Controller handover takes place during the TDMA schedule transmission by specifying the ID of the new controller. Finally, if the number of transmissions in a frame exceeds a predetermined threshold, each node listens only to data from certain other nodes. Each node determines which transmitters to listen to based on information obtained from all the nodes during the information summarization (IS) slot.

TRACE is therefore well suited to fulfill the tactical communication requirements of a squadron of soldiers that are all in communication range of each other. However, often soldiers will be scattered over a large area, requiring multi-hop communication rather than point-to-point communication. As yet, no solution exists in the art to extend TRACE to such a situation.

SUMMARY OF THE INVENTION

It is therefore an object of the invention to extend TRACE to situations in which multi-hop communication is required.

To achieve the above and other objects, the present invention is directed to an extension of TRACE for such multi-hop networks, known as Multi-Hop TRACE, or MH-TRACE. In MH-TRACE, the network is dynamically partitioned into clusters, which are maintained by clusterheads. Time is divided into super frames consisting of several frames, and each cluster chooses a frame during which nodes in the cluster can transmit data. Each frame includes a contention sub-frame, a summarization sub-frame, and a data sub-frame. Nodes transmit their initial channel access requests to their clusterhead in the contention sub-frame. As long as a node uses its reserved data slot, its channel access is renewed in subsequent frames. Nodes that are granted channel access through the transmission schedule transmitted by the clusterhead transmit a summarization packet prior to actual data transmission in the summarization sub-frame. Thus, each node knows the future data transmissions in its receive range by listening to the summarization packets. Nodes save energy by entering sleep mode whenever they do not want to be involved with a packet transmission or reception.

New cluster creation and existing cluster maintenance are designed to minimize interference between clusters that choose the same frame for transmission. Unlike existing clustering approaches, the clustering scheme according to the present invention is not based on connectivity information. In addition, we do not use frequency division or code division to avoid inter-cluster interference in order to enable each node in the network to receive all the desired data packets in its receive range, not just those from nodes within the same cluster. Thus, our clustering approach does not create hard clusters—the clusters themselves are only used for assigning time slots for nodes to transmit their data. Instead, each node creates its own soft listening cluster by choosing to listen to certain nodes in its receive range. Our cluster creation and maintenance algorithms do not bring high overhead to the network, and cluster stability is preserved, even in the presence of node mobility.

The invention provides a distributed MAC protocol for energy efficient voice packet broadcasting in a multi-hop radio network. In MH-TRACE, the network is dynamically partitioned into clusters by a distributed algorithm run by each radio, which does not use any global information except global clock synchronization. The clustering algorithm is simple and robust enough to ensure that the gain from clustering is much higher than the overhead required for cluster creation and maintenance, even in the presence of the node mobility.

In MH-TRACE, time is organized into superframes, which consist of several time frames. Each cluster chooses a frame for transmitting control packets and for the transmission of data from nodes in the cluster. The chosen frame is the frame with least interference, as measured by the node forming the cluster. However, each node in the network can receive all the desired packets in its receive range without any restriction based on the formed clusters. Each node learns about future data transmissions in its receive range from information summarization (IS) packets sent prior to data transmission in a designated time period by each transmitting node. Therefore, each node creates its own listening cluster and receives the packets it wants. By avoiding energy dissipation for receiving unwanted data packets or for waiting in idle mode, MH-TRACE guarantees the network to be highly energy efficient, approaching the theoretical minimum energy. Furthermore, since data transmission is contention free, the throughput of MH-TRACE is better than the throughput of CSMA type protocols under high traffic loads.

When compared to CSMA-type broadcast protocols like IEEE 802.11, MH-TRACE has three advantages: (i) energy efficiency due to the use of TDMA and data summarization slots, which allow nodes to enter sleep mode often, (ii) higher throughput due to the coordinated channel access, and (iii) support for real-time operation due to its time-frame based cyclic operation. We ran ns-2 simulations to investigate the performance of MH-TRACE and to compare it with IEEE 802.11. Initial results show that our dynamic clustering approach based on interference level creates robust clusters, and MH-TRACE performs better than IEEE 802.11 in terms of energy efficiency and throughput.

BRIEF DESCRIPTION OF THE DRAWINGS

A preferred embodiment of the present invention will be set forth in detail with reference to the drawings, in which.

DETAILED DESCRIPTION OF THE PREFERRED EMBODIMENT

A preferred embodiment of the present invention will now be set forth in detail with reference to the drawings.

Figure 1:
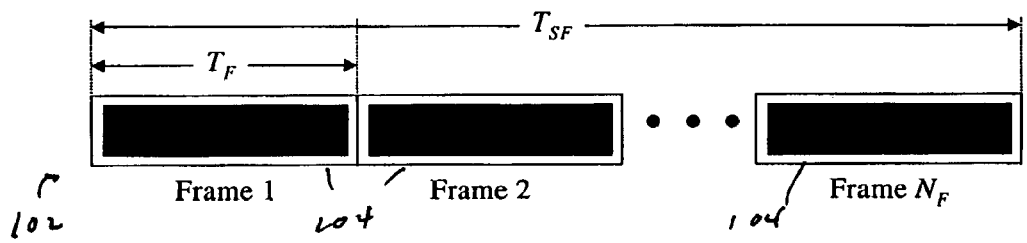
FIG. 1 shows a format of a super frame used in the preferred embodiment.

MH-TRACE is organized around super frames with duration $T_{SF}$ matched to the periodic rate of voice packets. As shown in FIG. 1, each super frame 102 consists of $N_F$ frames 104, each having a duration $T_F$.

Figure 2:
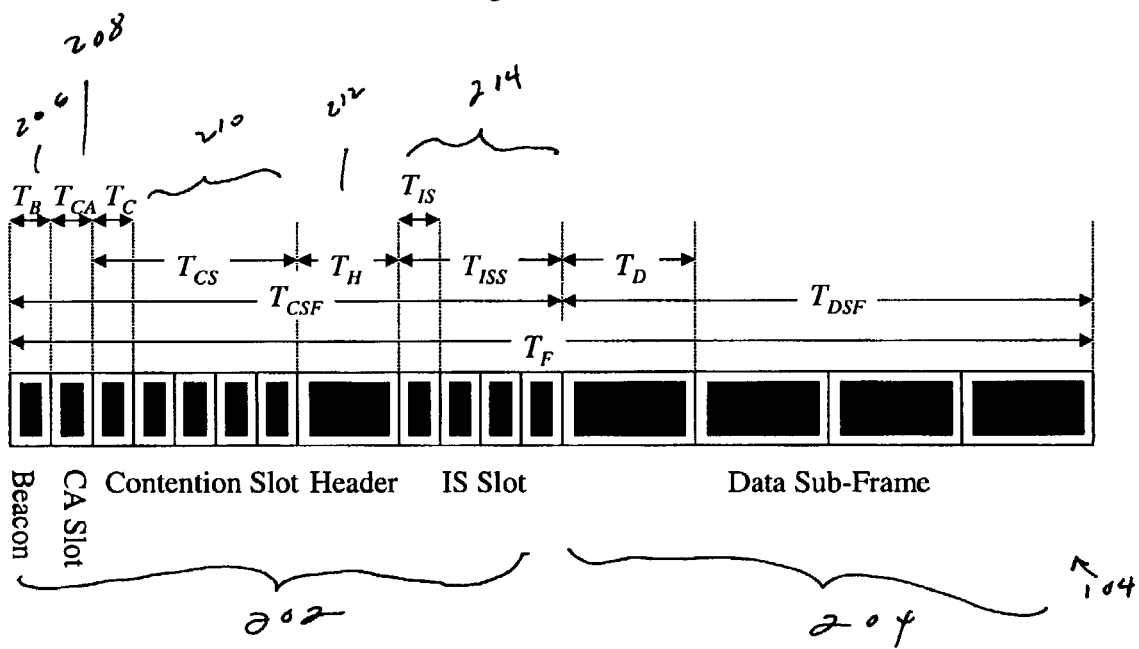
FIG. 2 shows a format of a frame contained in the super frame of FIG. 1.

The frame format is presented in FIG. 2. Each frame 104 consists of two sub-frames: a control sub-frame 202 and a data sub-frame 204. The control sub-frame 202 consists of a beacon slot 206, a clusterhead announcement (CA) slot 208, a contention slot 210, a header slot 212 and an information summarization (IS) slot 214.

At the beginning of each occupied frame, the clusterhead transmits a beacon message. This is used to announce the existence and continuation of the cluster to the cluster members and the other nodes in the transmit range of the clusterhead. By listening to the beacon and CA packets, all the nodes in the carrier sense range of this clusterhead update their interference level table. The contention slot, which immediately follows the CA slot, consists of $N_c$ sub-slots. Upon hearing the beacon, each node that has data to send but did not reserve a data slot in the previous cyclic frame, randomly chooses a sub-slot to transmit its request. If the contention is successful (i.e., no collisions), the clusterhead grants a data slot to the contending node. Following the contention subslot, the clusterhead sends the header, which includes the data transmission schedule of the current frame. The transmission schedule is a list of nodes that have been granted data slots in the current frame, along with their data slot numbers. A contending node that does not hear its ID in the schedule understands that its contention was unsuccessful (i.e., a collision occurred or all the data slots are already in use) and contends again in the following frame. If the waiting time for a voice packet during contention for channel access exceeds the threshold, $T_{drop}$, it is dropped.

The IS slot begins just after the header slot and consists of $N_D$ sub-slots. Nodes that are scheduled to transmit in the data sub-frame transmit a short IS message exactly in the same order as specified by the data transmission schedule. An IS message has an end-of-stream bit, which is set to one if the node has no data to send. Each receiving node records the received power level of the transmitting node and inserts this information into its IS table. The IS info table is used as a proximity metric for the nodes (i.e., the higher the received power, the shorter the distance between transmitter and receiver nodes). Nodes that are not members of this cluster also listen to the IS slot and record the received power level. Each node creates its own listening cluster by selecting the top $N_{max}$ transmissions that are the closest transmitters to the node. Note that other methods of deciding which nodes to listen to can be used within the TRACE framework by changing what data nodes send in the IS slot. Each node does not necessarily need to listen to a predetermined number of closest nodes—this can be chosen dynamically based on what data is being transmitted. Furthermore, the receive clusters can be based on information besides proximity. For example, if each node sends information about the data packet in the IS slot, nodes can choose their listening clusters based on whether or not they want to receive the packet described in the IS slot. Priority information can be transmitted in the IS slot as well, so nodes know to always listen to high priority data. Hence the network is softly partitioned into many virtual clusters based on the receivers; this is fundamentally different from transmitter based network partitioning.

The data sub-frame is broken into constant length data slots. Nodes listed in the schedule in the header transmit their data packets at their reserved data slots. Each node listens to at most $N_{max}$ data transmissions in a single super frame; therefore, each node is on for at most $N_{max}$ data slots.

A node keeps a data slot once it is scheduled for transmission as long as it has data to send. A node that sets its end-of-stream bit (in the IS packet) to one because it has no more data to send will not be granted channel access in the next frame (i.e., it should contend to get a data slot once it has new data to send). Automatic renewal of data slot reservation enables real-time data streams to be uninterrupted.

Figure 3:
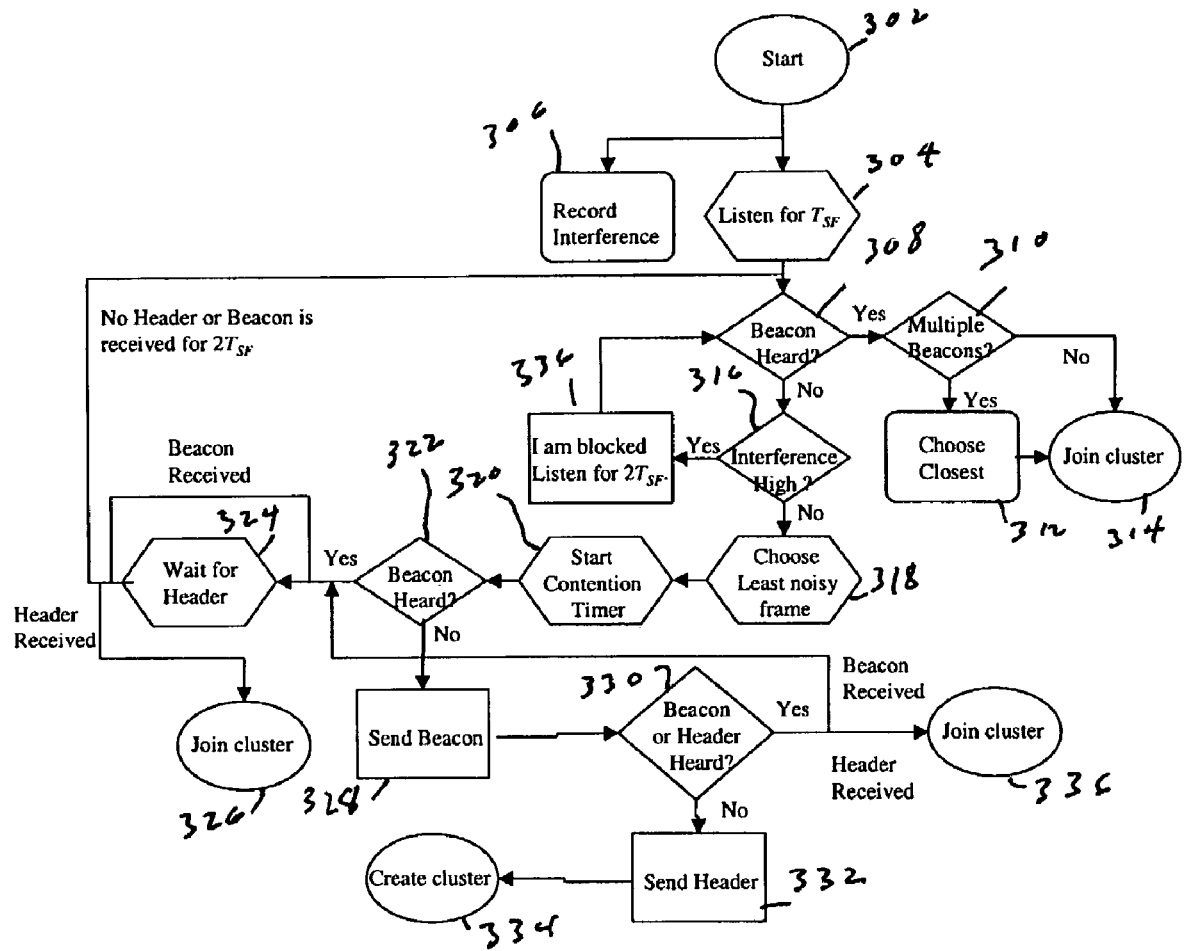
FIG. 3 shows a flow chart of a cluster creation algorithm according to the preferred embodiment.

FIG. 3 shows a flow chart of a cluster creation algorithm. At the initial startup stage of step 302, a node listens to the medium in step 304 to detect any ongoing transmissions for the duration of one super frame time, $T_{SF}$, to create its interference table in step 306 for each frame within the super frame. If there is already a clusterhead in its receive range, as determined in step 308, the node starts its normal operation. If it is determined in step 310 that more than one beacon is heard, the node that sent the beacon with higher received power is chosen as the clusterhead in step 312 (i.e., the closest clusterhead is chosen). Either way, the node joins a cluster in step 314.

If no beacon is detected in step 308, then the node checks the interference level of the least noisy frame in step 316 to see if the interference level is low enough to create a new cluster. If the interference level is low enough to create a new cluster, then the node picks a random time or the least noisy frame to transmit its own beacon signal in step 318, starts its contention timer in step 320, and begins to listen to the channel until its contention timer expires. If it is determined in step 322 that a beacon is heard in this period, then the node just stops its timer and starts normal operation; that is, it waits for a header in step 324 and joins the cluster in step 326. Otherwise, when the timer expires, the node sends the beacon in step 328 and assumes the clusterhead position. It is determined in step 330 whether a beacon or a header is heard. If a header is received, the node joins a cluster in step 336. If a beacon is heard, the node goes to step 324. If neither a beacon nor a header is heard, the node sends a header in step 332 and creates a cluster in step 334.

In case there is a beacon collision, none of the colliding nodes will know it, but the other nodes hear the collision, so the initial setup continues. All the previously collided nodes, and the nodes that could not detect the collision(s) because of capture, will learn of the collisions with the first successful header transmission.

Finally, if it is determined in step 316 that the node does not hear any beacons but the interference level is higher than the maximum level to start a new cluster, then the node is blocked from any transmissions. However, it can still receive all the packets in its receive range. The node listens for a time, e.g., equal to twice the superframe time in step 336 and then goes back to step 308. The reason for node blocking is that if a new cluster centered at the high interference region is created, then packet transmissions from the multiple clusters transmitting at the same time frame will collide at some locations with high probability. Thus, blocking new cluster creation is preferable over letting new clusters be formed with very high interference. Furthermore, if nodes are mobile, a blocking situation will only be temporary, and the node will be able to transmit data as soon as either it moves into range of an existing clusterhead or it moves far enough away from existing clusterheads that the node can start a new cluster without interfering with existing clusters.

Each clusterhead continuously records the interference level of each frame by listening to the beacon transmission and CA transmission slots, which are at the beginning of each frame. Since only the clusterheads are allowed to transmit in these slots, it is possible for each clusterhead to measure the received power level from other clusterheads and know the approximate distances to other clusterheads in the carrier sense range. A clusterhead can record the interference level of each frame by listening to the beacon slot, but the beacon slot becomes useless for a clusterhead's own frame, because it is transmitting its own beacon. CA transmission is used to determine the interference level of the co-frame clusters (i.e., clusters that have chosen to broadcast over the same frame). This is done by having each node transmit the CA packet with a probability $p_{CA}$. If this probability is set to 0.5, then each clusterhead records the interference level in its frame, on the average, at $4T_{SF}$ time. It is possible to use two consecutive CA slots, which has an average settling time of $2T_{SF}$.

Figure 4:
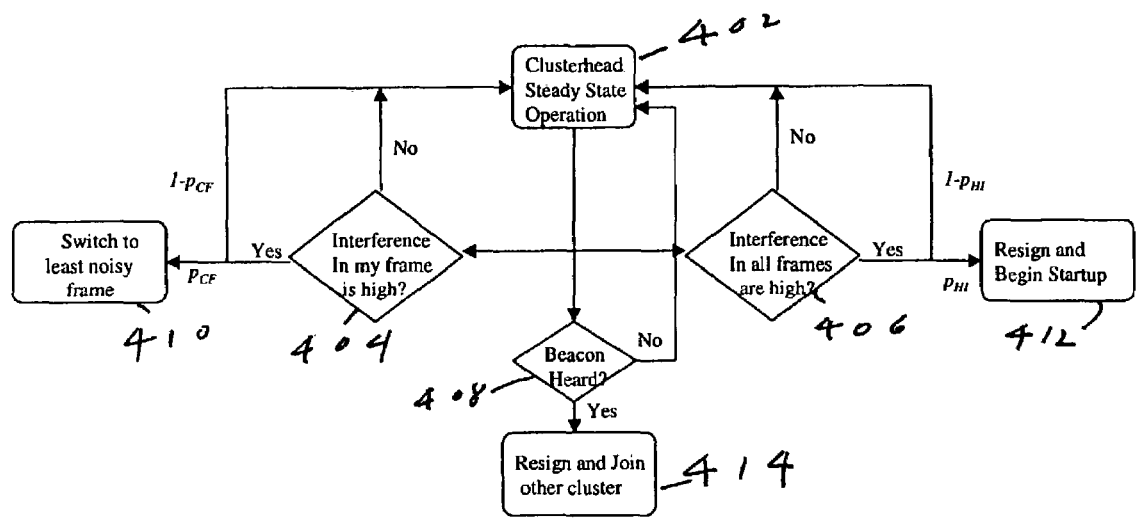
FIG. 4 shows a flow chart of a cluster maintenance algorithm according to the preferred embodiment.

A cluster maintenance protocol will be explained with reference to the flow chart of FIG. 4. A clusterhead keeps its frame (the steady state operation of step 402) unless the interference threshold becomes too high (step 404 or 406) or any other clusterhead enters in its receive range (step 408). A cluster leaves a frame with high interference in step 410 and moves to a low interference frame with probability $p_{CF}$. The reason for adding such randomness is to avoid the simultaneous and unstable frame switching of co-frame clusters, which are the interference source for each other. In case of high interference in all frames, the clusterhead resigns in step 412 with a probability $p_{HI}$. If this probability is set to 0.5, then the probability that only one of the two clusterheads resigns becomes 0.67. When two clusterheads enter in each other's receive range, the one who receives the other's beacon first resigns directly in step 414.

If a node does not receive a beacon packet from its clusterhead for $T_{NB}$ time, either because of mobility of the node or the clusterhead or the failure of the clusterhead, then it enters the initial startup procedure.

It is possible that network node distribution is not perfectly uniform or traffic at a specific portion of the network is higher than the other regions, especially at the regions close to the network center where node density is higher. In addition, node distribution changes continuously in time. This creates clusters with few nodes and underutilization of the channel. Some nodes are in the transmit range of more than one clusterhead, and they choose to be a member of the cluster with the closer clusterhead. For these nodes, if all the data slots in the cluster that they belong to are in use and another cluster in range has available data slots, they can contend for channel access from the further clusterhead rather than the one that is closer. Another option is to select the closest clusterhead that has available data slots. By incorporating this dynamic channel allocation scheme into MH-TRACE, one more degree of freedom is added to the network dynamics, which reduces the adverse affects of clustering.

Network-wide multi-hop broadcasting is an operation that drains network resources and leaves the network inoperable very quickly under even moderate traffic. Moreover, voice packets with delay limits cannot traverse more than several hops before being dropped. Thus, only a selected subset of the data packets is broadcasted to multiple hops in MH-TRACE.

MH-TRACE supports an optional prioritized operation mode. In this mode, nodes have three pre-assigned priority levels, of which Priority Level-1 (PL1) is the highest priority and PL3 is the lowest priority. The highest level has the highest QoS (quality of service), and the lowest level has the lowest QoS. PL1 and PL2 nodes get channel access in all situations. If all the data slots are already in use, reservation for some of the PL3 nodes are taken away and higher priority nodes are granted channel access.

All the nodes should listen to data from PL1 nodes, whether or not they are close to the nodes. However not all the nodes that belong to the same cluster can hear each other directly, so the clusterhead which can be heard by all the nodes in the cluster, rebroadcasts packets from PL1 nodes. Nodes that can hear more than one clusterhead also forward the PL1 packets they receive, so that other clusterheads can receive these packets. In this way, packets from PL1 nodes will be transmitted to a large number of nodes throughout the network. As an alternative, information can be transmitted between at least two of the clusterheads by way of at least two nodes, one of which is communicating with one cluster and the other of which is communicating with the other cluster, if those at least two nodes are in communication with each other.

Each node creates its receiver-based listening cluster, which has a maximum of $N_{max}$ members, by choosing the closest nodes based on the proximity information obtained from the received power from the transmissions in the IS slots. Priority has precedence over proximity; therefore, transmissions by PL1 nodes are always included in the listening cluster by removing the furthest node in the cluster. To avoid instantaneous changes in the listening clusters and to make them more stable, there is also a continuity rule: a member of the listening cluster cannot be excluded from the listening cluster until it finishes its talk spurt, which is a natural extension in the sense that if a speech stream is broken in the middle, the whole transmission becomes useless.

To test the performance of MH-TRACE, we started conducting simulations using the ns software package. We simulated conversational voice coded at 32 Kbps. The channel rate is chosen as 2 Mbps. The transport agent used in the simulations is very similar to UDP, which provides best effort service. Acronyms, descriptions and values of the parameters used in the simulations are presented in Table I below.

TABLE I

| Acronym | Description | Value |
|---|---|---|
| $T_{SF}$ | Super Frame duration | 24360 μs |
| $N_F$ | Number of frames within a super frame | 7 |
| $T_F$ | Frame duration | 3480 μs |
| $T_{CSF}$ | Control sub-frame duration | 560 μs |
| $T_{DSF}$ | Data sub-frame duration | 2968 μs |
| $T_B$ | Beacon slot duration | 24 μs |
| $T_{CA}$ | Clusterhead Announcement slot duration | 40 μs |
| $T_{CS}$ | Contention slot duration | 260 μs |
| $T_C$ | Contention sub-slot duration | 24 μs |
| $T_H$ | Header slot duration | 80 μs (max) |
| $T_{ISS}$ | Information summarization slot duration | 168 μs |
| $T_{IS}$ | Information summarization sub-slot duration | 24 μs |
| $T_D$ | Data slot duration | 424 μs |
| IFS | Inter-frame space | 8 μs |
| $T_{drop}$ | Packet drop threshold | 50.0 ms |
| $N_D$ | Number of data slots | 7 |
| $N_C$ | Number of contention sub-slots | 9 |
| $P_T$ | Transmit power | 0.6 W |
| $P_{TE}$ | Transmit electronics power | 0.318 W |
| $P_{PA}$ | Power amplifier power | 0.282 W |
| $P_R$ | Receive power | 0.3 W |
| $P_I$ | Idle power | 0.1 W |
| $P_S$ | Sleep power | 0.0 W |
| $m_s$ | Average spurt duration | 1.0 s |
| $m_g$ | Average gap duration | 1.35 s |

Super frame time is 24360 μs, consisting of seven frames (i.e., $N_F$=7). Frame time, $T_F$, is 3580 μs; of this 2968 μs is for the data sub-frame, DSF, and 560 μs is for the control sub-frame, CSF. There are 9 24 μs duration contention sub-slots, 7 24 μs duration IS sub-slots, and 7 424 μs duration data slots. Beacon, CA, contention, and IS packets are all 4 bytes. The header packet has a variable length of 4-18 bytes, consisting of 4 bytes of packet header and 2 bytes of data for each node to be scheduled. Data packets are 104 bytes long, consisting of 4 bytes of packet header and 100 bytes of data. Each slot or sub-slot includes 8 μsec of guard band (IFS) to account for switching time and round-trip time.

For voice source modeling, we assume each node has a voice activity detector, which classifies speech into "spurts" and "gaps" (i.e., gaps are the silent moments during a conversation). During gaps, no data packets are generated, and during spurts, data packets are generated in the rate of the speech coder, which is 32 Kbps in our case. Both spurts and gaps are exponentially distributed statistically independent random variables, with means $m_s$ and $m_g$, respectively. In our simulations and analysis we used the experimentally verified values of $m_s$ and $m_g$, which are 1.0 s and 1.35 s, respectively.

We used the energy model, where transmit power consists of a constant transmit electronics part, $P_TE$, and a variable power amplifier part, $P_{PA}$. Hence the transmit power, $P_T$, can be expressed as the sum of two terms $$P_T = P_{TE} + P_{PA} \qquad (1)$$

$P_{PA}$ should be adjusted to compensate for the path loss in wave propagation. The propagation model is a hybrid propagation model, which assumes $d^2$ power loss for short distances and $d^4$ power loss for long distances. Receive power, $P_R$, is dissipated entirely on receiver electronics. Idle power, $P_I$, is the power needed to run the electronic circuitry without any actual packet reception. In sleep mode, the radio is just shut down so sleep mode power, $P_S$, is very low.

Figure 5:
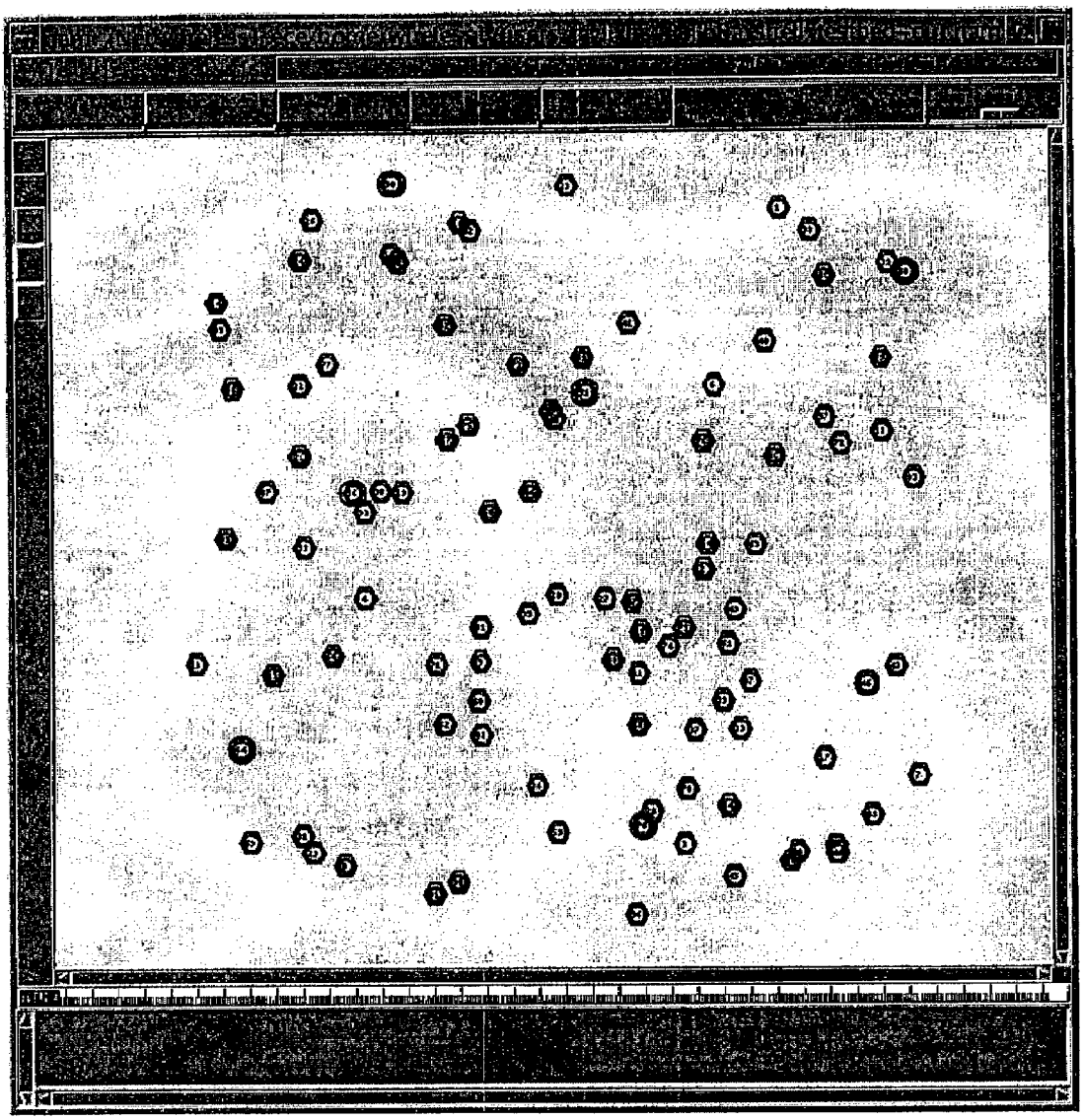
FIG. 5 shows a distribution of nodes at 0.050 sec.
Figure 6:
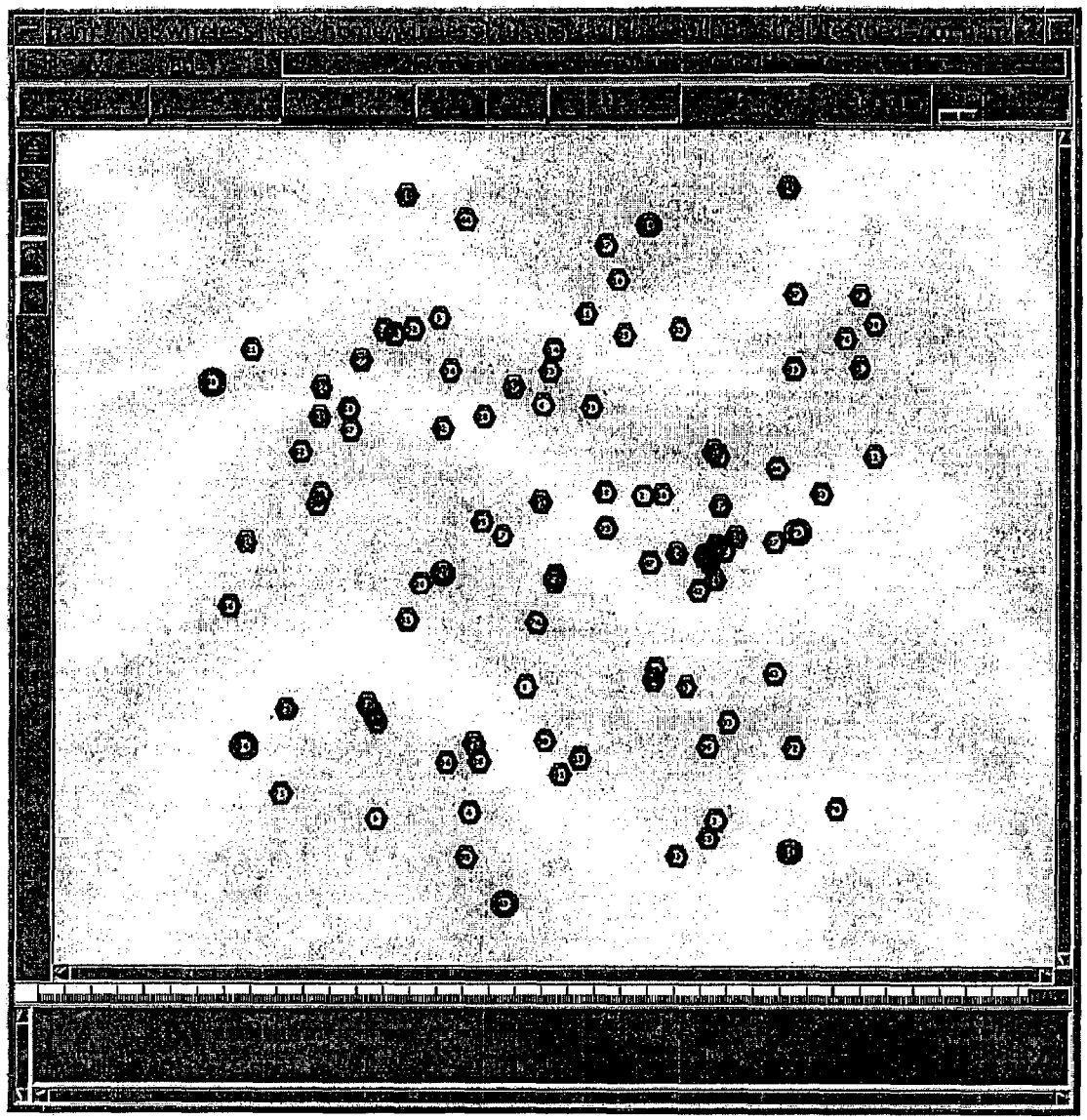
FIG. 6 shows a distribution of the same nodes at 100 sec.

We used the random way-point mobility model to create mobility scenarios. FIG. 5 shows a snapshot of the distribution of 100 nodes over a 750 m by 750 m area at 0.050 s. FIG. 6 shows the snapshot at 100.0 s. Node speed is a uniform random variable between 0.0 m/s and 5.0 m/s (average speed of a marathon runner). The circles around the nodes show the clusterheads. We ran the simulation for 100.0 s. The number of clusterheads throughout the entire simulation time is 20, and the average number of blocked nodes is 0.58 nodes/frame.

Figure 7:
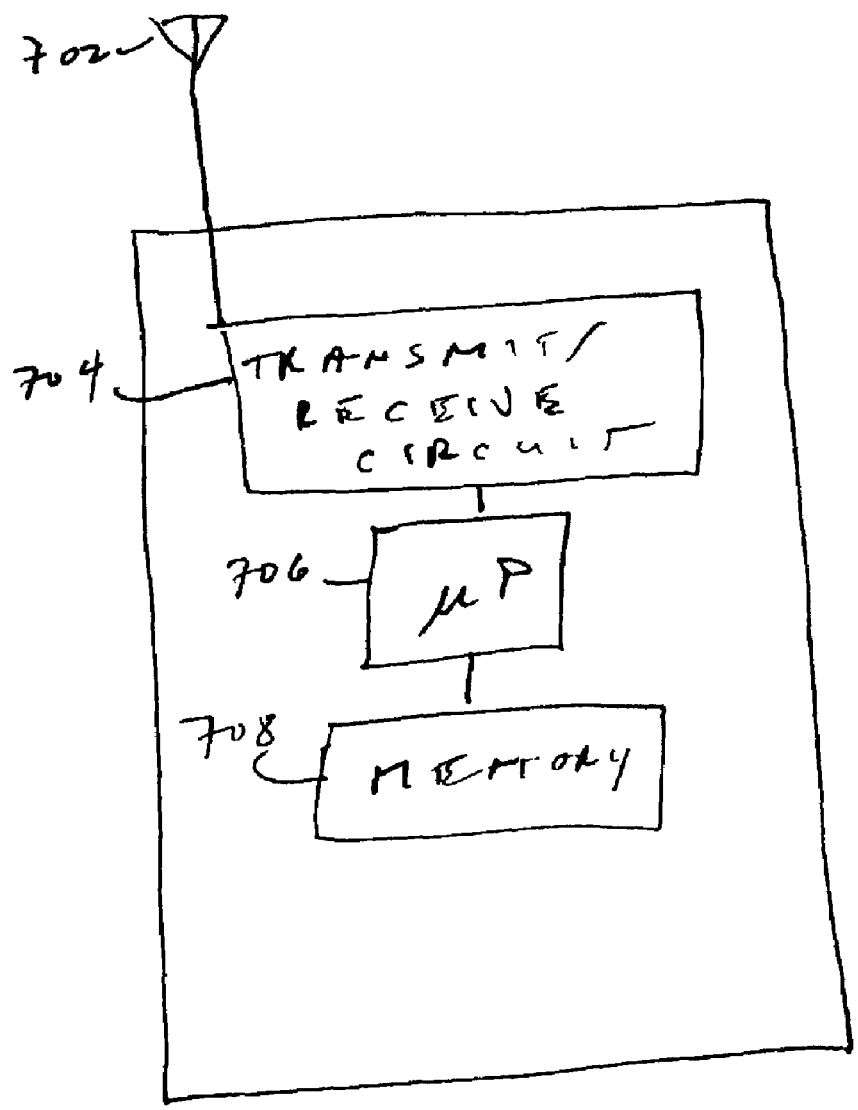
FIG. 7 shows a schematic diagram of a device usable as a node in the preferred embodiment.

In MH-TRACE, each node contains the functionality to perform the operations described above, either as a clusterhead or as merely a node as required. A block diagram of a radio device capable of functioning as an MH-TRACE node is shown in FIG. 7. The radio device 700 includes an antenna 702 and circuitry 704 for transmitting and receiving under the control of a processor 706. A non-volatile memory 708 includes the software for permitting the processor 706 to perform the required operations. Of course, other components can be included, based on the sort of network to be implemented, e.g., equipment for a voice network, a video/voice network, etc.

MH-TRACE is energy-efficient when compared to existing MAC protocols, like IEEE 802.11. Under low to medium traffic load, both MH-TRACE and 802.11 have similar throughput characteristics, but under high traffic, MH-TRACE performs better.

The clustering approaches proposed in the literature are mostly link level algorithms, which create clusters based on connectivity information, which changes quickly, thus forcing the network to create and destroy clusters very fast. This creates high overhead on a mobile network and annuls the gain obtained from clustering. In MH-TRACE, on the other hand, cluster formation can be completely based on MAC layer information; cluster creation, termination, and maintenance do not bring much overhead to the network.

The most important advantage of MH-TRACE is that it achieves traffic adaptive energy efficiency in a multi-hop network without using any global information except synchronization. We used the cluster concept in such a way that each node creates its own listening cluster as if it is operating under a CSMA type protocol. However, collisions of data packets are also avoided by means of coordination via scheduling. Thus, advantageous features of fully centralized and fully distributed networks are combined to create a hybrid and better protocol for real-time energy efficient broadcasting in a multi-hop network without making any assumptions about global knowledge.

While a preferred embodiment has been set forth above, those skilled in the art will readily appreciate that other embodiments can be realized within the scope of the invention. For instance, the clustering technique is not limited to voice networks, but can be implemented with any suitable network. As an example, a group of hearing-impaired persons can have communication devices with cameras and low-resolution screens large enough to display sign language intelligibly, possibly with several panels. Given the ability to transmit image data at a sufficient rate, e.g., with MPEG compression, the devices can be linked through MH-TRACE to permit visual communication. Furthermore, numerical values are illustrative rather than limiting; those skilled in the art who have reviewed the present disclosure will readily appreciate that other numerical values can be implemented as needed. Therefore, the present invention should be construed as limited only by the appended claims.

We claim:

1. A method for transmitting information in a network having a plurality of nodes which are grouped into clusters, the method comprising:
   (a) dividing time into superframes, each superframe comprising a predetermined number of frames, each frame comprising (i) a beacon slot for sending a beacon, (ii) a plurality of contention slots for sending requests for data slots, (iii) a header slot for sending a header which comprises a transmission schedule for the frame, (iv) a plurality of information summarization slots for sending summaries of the information, and (v) a plurality of data slots, each for information transmission by one of the nodes;
   (b) permitting each of the clusters within the network to choose one of the predetermined number of frames;
   (c) transmitting information within each of the clusters during said one of the predetermined number of frames in each superframe; and
   (d) transmitting information between at least two of the clusters by way of one or more nodes;
   wherein step (c) comprises:
   (i) in each of the frames, permitting each of the plurality of nodes to reserve one of the plurality of data slots by sending the requests in the contention slots; and
   (ii) maintaining a reservation of each of the plurality of data slots which is reserved by one of the plurality of nodes until said one of the plurality of nodes indicates that it has stopped transmitting; and wherein:
   each node sends an information summarization packet during a corresponding one of the information summarization slots; and
   each node indicates that it has stopped transmitting by sending an end-of-transmission bit in its information summarization packet.

2. The method of claim 1, wherein:
   each node records a power level of the information summarization packet sent by each of a plurality of other nodes to determine a listening cluster of nodes based at least partially on proximity; and
   said each node listens to the nodes in the listening cluster.

3. The method of claim 2, wherein:
   each node receives the information summarization packets sent by the nodes in its listening cluster, determines in accordance with the information summarization packets which information it wishes to receive, and listens only to the nodes sending the information that it wishes to receive.

4. The method of claim 3, wherein, when a node is not transmitting information or listening, the node enters sleep mode.

5. The method of claim 1, wherein, when a node sends the end-of-transmission bit, that node loses its reserved data slot.

* * * * *